US010955812B2

(12) United States Patent
Schlack et al.

(10) Patent No.: US 10,955,812 B2
(45) Date of Patent: *Mar. 23, 2021

(54) NAVIGATION SYSTEM FOR CLEAN ROOMS

(71) Applicant: Sartorius Stedim Biotech GmbH, Goettingen (DE)

(72) Inventors: Stefan Schlack, Goettingen (DE); Lars Boettcher, Melsungen (DE); Mario Becker, Goettingen (DE)

(73) Assignee: Sartorius Stedim Biotech GmbH

( * ) Notice: Subject to any disclaimer, the term of this patent is extended or adjusted under 35 U.S.C. 154(b) by 83 days.

This patent is subject to a terminal disclaimer.

(21) Appl. No.: 16/244,642

(22) Filed: Jan. 10, 2019

(65) Prior Publication Data

US 2019/0146452 A1 May 16, 2019

Related U.S. Application Data

(62) Division of application No. 14/888,824, filed as application No. PCT/EP2014/001706 on Jun. 24, 2014, now Pat. No. 10,222,778.

(30) Foreign Application Priority Data

Sep. 11, 2013 (DE) ...................... 10 2013 015 164.3

(51) Int. Cl.
  *G05B 19/19* (2006.01)
  *G05B 19/418* (2006.01)
  *G05B 15/02* (2006.01)

(52) U.S. Cl.
  CPC ............. *G05B 19/19* (2013.01); *G05B 15/02* (2013.01); *G05B 19/4188* (2013.01);
  (Continued)

(58) Field of Classification Search
  CPC .... G05B 19/19; G05B 15/02; G05B 19/4188; G05B 2219/39147; G05B 2219/32085;
  (Continued)

(56) References Cited

U.S. PATENT DOCUMENTS 5,730,517 A  3/1998 Berglund
9,671,798 B2  6/2017 Hodge
(Continued)

FOREIGN PATENT DOCUMENTS

EP  2290592  3/2011

OTHER PUBLICATIONS

International Search Report.
(Continued)

*Primary Examiner* — Robert E Fennema
*Assistant Examiner* — Marzia T Monty
(74) *Attorney, Agent, or Firm* — Gerald E. Hespos; Michael J. Porco; Matthew T. Hespos

(57) ABSTRACT

A method for configuring a clean room (2) for the manufacture of pharmaceutical products and the manufacture of pharmaceutical products includes the steps: selecting a pharmaceutical product for the manufacture in the clean room (2); determining one or a plurality of specific devices (16) and/or one or a plurality of specific materials (18) for the manufacture of the selected pharmaceutical product; and assigning locations for the particular, respectively specific devices (16) and/or specific materials (18) in the clean room (2) and, that is, by using a navigation system (4). The navigation system (4) issues at least one notification (6, 8, 10, 12, 14) associated with a location in the clean room (2) indicating where the specific device (16) and/or the specific material (18) for the manufacture of the selected pharmaceutical product is/are to be placed.

20 Claims, 1 Drawing Sheet

(52) U.S. Cl.
CPC .............. *G05B 2219/31054* (2013.01); *G05B 2219/31334* (2013.01); *G05B 2219/31466* (2013.01); *G05B 2219/32085* (2013.01); *G05B 2219/39147* (2013.01); *Y02P 90/02* (2015.11)

(58) Field of Classification Search
CPC ........... G05B 2219/31466; G05B 2219/31334; G05B 2219/31054; Y02P 90/265; Y02P 90/185; Y02P 90/16; Y02P 90/04; Y02P 90/24
USPC ........................................................ 700/112
See application file for complete search history.

(56) References Cited

U.S. PATENT DOCUMENTS

| | | |
|---|---|---|
| 2002/0107674 A1 | 8/2002 | Bascle |
| 2005/0086008 A1 | 4/2005 | DiGianfilippo |
| 2006/0058915 A1 | 3/2006 | Sheehan |
| 2009/0267772 A1 | 10/2009 | Dehnadi |
| 2011/0022201 A1 | 1/2011 | Reumerman |
| 2011/0209336 A1 | 9/2011 | Lam |
| 2012/0041778 A1 | 2/2012 | Kraft |
| 2013/0109291 A1* | 5/2013 | Holtz ...................... B23P 11/00 454/187 |
| 2013/0184849 A1 | 7/2013 | Koster |
| 2014/0207326 A1 | 7/2014 | Murphy |

OTHER PUBLICATIONS

Anonymous: "Pharmaceutical Manufacturing Facility Desing"—Apr. 8, 2006, Seiten 1-2, XP05514402.
Anonymous: "pharmaceutical facility design promodel—Google-Suche"—Oct. 2, 2014, XP55144000.
Guirardello, R. et al.—"Optimization of process plant layout with pipe routing", Computers & Chemical Engineering, Pergamon Press, Oxford, GB, Bd. 30, Nr. 1, Nov. 15, 2005, Seiten 99-114, XP027759815.
A. Burdort et al.—"CAPD-computer-aided plant design", Computers & Chemical Engineering, Bd. 28, Nr. 1-2, Jan. 1, 2004, Seiten 73-81, XP055143988.
Hamamoto S. et al.—"Development and validation of genetic algorithm-based facility layout a case study in the pharmaceutical industry", International Journal of Production Research, Taylor and Francis, GB, Bd. 37, Nr. 4, Jan. 1, 1999, Seiten 749-768, XP009180524.
Drira et al.—"Facility layout problems: A survey", Annual Reviews in Control, Pergamon, Amsterdam, NL, Bd. 31, Nr. 2, Nov. 5, 2007, Seiten 255-267, XP022364929.

* cited by examiner

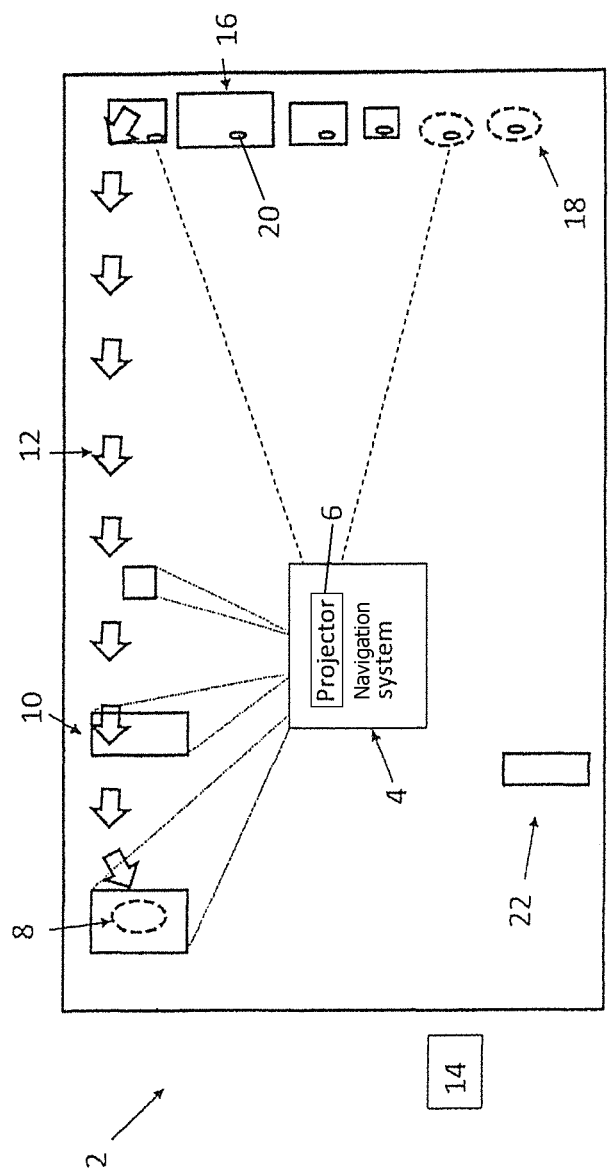

NAVIGATION SYSTEM FOR CLEAN ROOMS

The present application is a divisional application of U.S. patent application Ser. No. 14/888,824, filed Nov. 3, 2015, the contents of which are hereby incorporated by reference in their entirety.

BACKGROUND

1. Field of the Invention

The present invention relates to a method for configuring a clean room for the manufacture of pharmaceutical products, a method for the manufacture of pharmaceutical products using a navigation system, a computer program for carrying out the method, and a clean room.

2. Description of the Related Art

In general, production facilities for the manufacture of pharmaceutical or biopharmaceutical products are designed for less specific products, and the production facilities typically include well supervised, classified clean rooms in which acid-resistant, steel-clad devices are fixedly installed. In addition, the individual manufacturing steps required for the manufacture of a (bio)pharmaceutical product are mostly distributed to different clean rooms which are separated from one another.

In particular, the disadvantage of these production facilities is that they are very inflexible in adjusting to the manufacture of new/other products, for example, drugs or biopharmaceuticals, so that it requires a great effort to manufacture a new/other product. This circumstance is associated with that adjusting from one product to another requires a long planning process. Furthermore, it is disadvantageous that if a specific product is only to be manufactured for a short period of time, a great effort is still to be expended to respectively adapt the production facility. This particularly applies if a product is required upon short notice or urgently; however, subsequently the previous product is to be manufactured again.

A diversion from the conventional production facilities is, however, not possible without further action because the quality and safety standards are to be maintained. This particularly applies to aspects such as using the correct devices and materials so that the product is manufactured with the correct composition.

In other words, conflicting goals result from reducing the cost for providing the production facilities and reducing the risk of product defects.

Furthermore, a more flexible design of the production facilities requires very well trained and reliable personnel so that mistakes and human error are reduced to a minimum.

The malfunctioning of a production facility for (bio) pharmaceutical products may have severe consequences. In addition to the repercussions from loosing market shares or paying penalties, the malfunctioning of a production facility may also lead to bottlenecks in the supply or the wrong patient care owing to erroneous medication.

For this reason, one aspect of the present invention is to provide an opportunity which, on the one hand, enables to reduce the costs for providing production facilities and, on the other hand, enables to flexibly adjust production facilities to new products, reducing malfunctioning risks and manufacturing errors to a minimum.

SUMMARY

A first aspect of the present invention relates to a method for configuring a clean room for the manufacture of pharmaceutical products including the following steps:
Selecting a pharmaceutical product to be manufactured in a clean room;
Determining one or a plurality of specific devices and/or one or a plurality of specific materials for the manufacture of the selected pharmaceutical product; and
Assigning one or a plurality of locations for the particular, respectively specific devices and/or specific materials in the clean room and, that is, by using a navigation system, and the navigation system issues at least one notification associated with a location in the clean room indicating where the specific device and/or the specific material for the manufacture of the selected pharmaceutical product is to be placed.

A pharmaceutical product may, in particular, be a drug.

According to the present invention, it is provided that a clean room may be used in a flexible and versatile manner so that a plurality of different pharmaceutical products may be manufactured in the clean room. Preferably, the clean room is designed in such a manner that it has sufficient power, water and/or discharge connections for the manufacture of different pharmaceutical products. In other words, the method according to the present invention enables one to rearrange a clean room in the short term so that the entire manufacture of a pharmaceutical product is adjusted in the clean room and another pharmaceutical product may be manufactured in a timely manner in the same, rearranged clean room. For this purpose, for example, the navigation system determines which devices are to be used to manufacture a specific (other) pharmaceutical product and from which materials this drug is made up. After it has been determined by which specific devices and/or specific materials a certain drug is manufactured, these specific devices or materials are assigned a location in the clean room.

In particular, the steps for selecting and determining may be at least partially carried out in an automated manner. For example, the navigation system may be a computerized system, and the user may make an entry via an interface. A selection of a pharmaceutical product to be manufactured in a clean room is carried out by way of this entry, for example, from a list of selectable pharmaceutical products specified by the navigation system.

In particular, the method according to the present invention may include the step "providing a plurality of manufacturing instructions for the manufacture of pharmaceutical products." Preferably, manufacturing instructions include a plurality of data sets for the manufacture of pharmaceutical products, and one or a plurality of pharmaceutical products to be manufactured is selected from the plurality of manufacturing instructions.

A plurality of manufacturing instructions, for example, in the form of data sets, of different pharmaceutical products may be stored in the navigation system, and these data sets, for example, the composition of the respective pharmaceutical products, include the required/specific devices and/or required/specific materials and their arrangement or location in the clean room.

Preferably, the navigation system automatically assigns, based on the step for determining, a respective location.

Within the context of the assignment, the navigation system makes an entry informing the user at which location a device/materials is to be positioned in the clean room.

This location, which is assigned to a specific device or a specific material in the clean room, depends on various aspects, for example, an efficient use of space in the clean room and/or an efficient arrangement of the devices to one another for an optimal manufacturing process. Preferably, the manufacturing instructions include a data set for the selected pharmaceutical product, and the data set for a specific clean room or for the clean room includes information about the locations at which the specific devices and/or specific materials are to be situated. Preferably, the navigation system may retrieve the locations in the clean room for the specific devices and/or materials of the selected pharmaceutical product.

A location in the clean room may be, for example, defined by GPS coordinates or ranges of GPS coordinates (GPS=Global Positioning System). Furthermore, a location in a clean room may be defined by one or a plurality of grid squares.

The navigation system visually and/or acoustically and/or haptically indicates to a user or installer where a specific device is to be situated in the clean room.

For example, a visual notification may include a projection beam so that the projection beam illuminates a quadrant or a particular location in the clean room and a user is able to place the particular specific device/the specific material in the location illuminated by the projection beam. Alternatively or additionally, a visual notification may represent a virtual illustration of the clean room, and the virtual illustration may display the assigned location. For example, this virtual illustration may be displayed by way of a tablet computer or an iPad.

Furthermore, an acoustic notification may include a voice message which informs the user at which location in the clean room a specific device is to be situated.

A haptic notification may, for example, include raised floor markers in the clean room which, preferably, are variably adjustable. Preferably, these raised floor markers may include lines and/or arrows.

Thus, the navigation system facilitates the conversion of the clean room in that it enables an efficient and rapid conversion.

A further aspect of the present invention relates to a method for the manufacture of pharmaceutical products using a navigation system including the steps according to the first aspect and the following steps:

Determining a sequence of manufacturing steps for processing specific materials;
Issuing a command which includes at least a portion of manufacturing steps for processing specific materials; and
Issuing a status notification about the manufacture of the selected pharmaceutical product when a system request is made.

The term determining is to be understood particularly as a system query. In particular, this may be carried out in such a manner that a user queries a navigation system. Alternatively or additionally, it may be provided that the navigation system automatically determines a sequence of manufacturing steps as soon as the clean room is completely set up for the manufacture of the pharmaceutical product. Determining may particularly include a query of data base contents of the navigation system.

If a sequence has been determined, a command is issued. A command may, for example, include a listing of manufacturing steps which is displayed on a monitor/display of the navigation system and/or is provided by the navigation system in paper form. The issued command may also only include a portion of the necessary manufacturing steps required to manufacture the selected pharmaceutical product.

In particular, a plurality of commands may be issued sequentially. This plurality of commands may ultimately result in the total of manufacturing steps. Moreover, commands following in sequence may include partially overlapping manufacturing steps. This is, for example, the case when the subsequent command is issued at a point in time when the manufacturing steps according to the first command have not yet been completed. In other words, a first (previous) command may include the manufacturing steps n through n+5 and the second (subsequent) command may include the manufacturing steps n+4 through n+9.

The step "issuing a status notification about the manufacture of the selected pharmaceutical products" may, for example, include a message which informs a user about what percentage of the manufacture of a particular batch has been completed and/or how many manufacturing steps still have to be carried out. Such a status notification is issued when a system request is made. A system request may be made automatically. For example, a system request may be made at specified times/times of the day. Additionally or alternatively, a system request may be made by a user entry at an interface. Preferably, the status notification may be issued via a monitor, graphic user interface (GUI=graphic user interface) and/or in paper form.

Preferably, the methods include the step "issuing user information about the presence or absence of specific devices and/or specific materials."

Different devices and/or different materials may be, for example, stored in one or a plurality of storage facilities. If a pharmaceutical product has been selected and the corresponding specific devices and/or specific materials have been determined, the specific devices and/or specific materials may be moved, preferably one after the other, into the clean room to there be situated at the respectively assigned location.

For example, a user may make a system request as to whether the clean room has already been fitted with all specific devices/specific materials. Based on the system request, a user information may be issued about which specific devices and/or specific materials are provided or missing in the clean room at the point in time of the request. This system request may, for example, be directed at the navigation system.

Additionally or alternatively, information immediately accessible to or stocked for the specific devices and/or specific materials may be stored in the navigation system. Accordingly, after determining the specific devices and/or specific materials, user information about the presence or absence of specific devices and/or specific materials in terms of availability is issued.

Preferably, the navigation system provides information about which specific devices/specific materials are stored in which storage room/rooms. Furthermore, the navigation system preferably provides information whether a specific device and/or a specific material is available at a particular point in time or during a certain time period.

Preferably, the methods include the step "ordering missing specific devices and/or missing specific materials."

If specific devices and or specific materials are not available at a particular point in time, these missing specific devices and/or specific materials are ordered.

Preferably, the ordering may be carried out automatically. For example, if the specific devices/specific materials have been determined and several of the specific devices/specific materials are missing or unavailable at a certain point in time, the navigation system is able to automatically order the missing or unavailable specific devices/specific materials.

Alternatively or additionally, user information about the number of available alternative specific devices/specific materials is issued.

Alternatively, the ordering is carried out only after approval by a user.

Preferably, it may be provided that the user information about the presence or absence of specific devices and/or specific materials is issued by default if at least one specific device and/or specific material is unavailable or unavailable during a particular time period. In other words, user information is issued if an automated system query is conducted.

Alternatively, it may be provided that user information about the presence or absence of specific devices and/or specific materials is issued only if a user makes a system request.

Preferably, the specific devices and/or specific materials have identifiers for identifying and/or locating the specific devices and/or specific materials by using the navigation system.

For example, the devices and/or materials may be provided with radio frequency identification (RFID) tags and/or barcodes and/or global positioning system (GPS) transmitters/receivers. For example, an indicator may detect/identify a specific device/a specific material so that, by way of the navigation system, it may be determine whether the specific device/the specific material is already located in the clean room and/or at the assigned location. Furthermore, it may be determined by way of the identifiers in which storage room or other clean room the specific device/the specific material is located. In other words, a specific device/a specific material may easily be locate by way of an identifier.

Preferably, the methods include the following step:
Providing markers in the floor area of the clean room, and the markers include a grid from a plurality of fields, and at least one portion of the fields has at least one portion of a space holder for an assigned, specific device and/or an assigned specific material.

In particular, the provided markers in the floor area of the clean room may be only one portion or one type of markers. For example, further markers may be placed in wall and/or ceiling areas.

For example, a marker may be a colored or otherwise visually highlighted rectangle, cross, line, letter and/or numbers, etc.

For example, the floor area of the clean room may be at least partially divided into fields, for example, rectangles, squares, hexahedrons, triangles, etc. so that the fields form a grid. A specific field or group of fields may be assigned as a location to a specific device/a specific material.

For example, the notification carried out by the navigation system may be a projection beam which points to/illuminates one or a plurality of fields so that the user may detect at which field(s) a specific device/a specific material is to be placed.

Additionally or alternatively, the navigation system may issue a notification which displays a virtual illustration of a clean room on a monitor or a tablet computer, and the rectangle marks or displays in the virtual illustration where a specific device/a specific material is to be placed.

Alternatively or additionally, a location may be assigned in that a rectangle is provided with a number and the navigation system displays the number of the field on a display or a tablet computer where, for example, a specific device is to be situated. In other words, the navigation system displays a notification on the display, and the notification refers to a marker. If the marker is a field having a number, the number of the field is displayed on the display, and the field corresponds with a location of a specific device/a specific material. Furthermore, the floor area in the clean room may preferably have markers which correspond with a checkerboard pattern [made up] of fields. Furthermore preferably, one or a plurality of 3D barcodes may be provided as markers in the floor area of the clean room.

Furthermore, the at least one notification is preferably a light projection, an electromagnetic field and/or a display. The notification preferably indicates the location in the clean room where the specific device and/or the specific material for the manufacture of the selected pharmaceutical product is/are to be place. An electromagnetic field may, for example, provide an acoustic or visual signal in the clean room, which indicates to a user to which location in the clean room a specific device/a specific material is to be taken.

Furthermore, the methods preferably include the step "assigning ports in the clean room to which the specific devices and/or specific materials are to be connected." Preferably, assigning ports is carried out by using the navigation system, and the navigation system issues at least one notification indicating to which specific ports the specific devices and/or specific materials are to be connected in the clean room.

The specific devices have ports, for example, inlets, outlets, water, power and discharge connections and/or connectors. Furthermore, the specific devices may include one or a plurality of ports and/or connectors to which at least one additional specific device is connectable. In other words, ports may connect two or more specific devices to one another. Furthermore, ports or connectors may be provided at the specific devices so that one or a plurality of specific materials may be connected to the specific devices.

In particular, the concept of "assigning ports in a clean room to which the specific devices and/or specific materials are to be connected" is also to be understood in the sense that devices are connected/linked to one another.

Furthermore, ports or connectors are provided in the clean room itself to which specific devices are able to be connected.

Furthermore preferably, the methods include the step "issuing a status notification as to whether a specific device and/or specific material is connected to the specific ports according to the assignment when a system request is made."

Preferably, the methods include the step "assigning ports in the clean room to the specific devices and/or specific materials in the clean room."

Furthermore preferably, the methods include the step "providing a virtual image of a nominal state of a clean room, and based on a system request, the virtual image is compared to the actual state of the clean room."

In particular, the virtual image of a nominal state may display or include the locations in which the specific devices and/or the specific materials are to be placed. Preferably, the virtual image of the nominal state of the clean room may be displayed compared to the actual state via the notification of the navigation system.

A further aspect relates to a computer program product which is, when loaded onto a computer, designed for carrying out one of the previously described methods or their preferred embodiments.

A further aspect relates to a clean room for the manufacture of pharmaceutical products using a navigation system, in which a plurality of different pharmaceutical products may be manufactured, and for the manufacture of a pharmaceutical product, selected from the different pharmaceutical products, respectively specific devices and/or specific materials may be placed in the clean room, and using the navigation system, at least one notification may take place indicating the position or positions in the clean room where the specific devices and/or the specific materials necessary for the manufacture of the selected pharmaceutical product are to be placed.

The embodiments, descriptions and definitions regarding the previously described methods apply, with regard to its design and use, also to the clean room according to the present invention.

Advantageously, using the previously described methods may ensure that the manufacture of a pharmaceutical product is carried out in a safe and reliable manner while, at the same time, the cost of highly qualified personnel does not increase.

The present invention is subsequently described in an exemplary manner on the basis of exemplary embodiments in reference to the appended FIG. In particular, individual features of the aspects and/or embodiments previously and/or subsequently described may be, independent from the respective aspect or the respective embodiment, combined into further embodiments.

BRIEF DESCRIPTION OF THE DRAWINGS

FIG. 1 shows a schematic representation of a clean room having a navigation system.

DETAILED DESCRIPTION

FIG. 1 shows schematically a clean room 2, having a navigation system 4, in which specific devices 16 and materials 18 are to be situated. Navigation system 4 includes a projector 6 which projects a projection 8 of a particular specific material 18 in the floor area of clean room 2 so that a user may easily detect at which position in clean room 2 specific material 18 is to be placed. In other words, projection 8 of the specific material corresponds with the location which the particular specific material 18 is to occupy.

FIG. 1 furthermore shows a projection 10 of a particular specific device 16 so that a user may detect in the same manner at which location in clean room 2 specific device 16 is to be placed.

Projections 8, 10 may, for example, project schematically the contours of respective device 16 and/or respective material 18 onto the floor area of clean room 2. Alternatively or additionally, a projection 8, 10 may be a 3-dimensional or holographic illustration of respective device 16 and/or respective material 18. Furthermore, a projection 8, 10 may be punctiform so that only a point of light appears in the floor area of clean room 2. Furthermore, a projection 8, 10 may illustrate a number, a number sequence, a barcode and/or a letter or letter sequence so that a user may, based on the number, etc., detect or determine by a barcode which device 16/which material 18 is to be placed in the location where the number, etc. is projected. For this purpose, the number or the letter is assigned to a device 16 or a material 18.

Furthermore, one or a plurality of projections 12 may be provided in the floor area of clean room 2 which show a user the way to one or a plurality of projections 8, 10 in the clean room. Such projections 12 may, for example, be in the form of an arrow.

In particular, a projection may be movable so that a user may follow from a point of departure or a starting point of the movable projection until the end point, namely, the assigned location, is reached.

Navigation system 4 may furthermore output one or a plurality of signals which indicate whether a device 16 or a material 18 is correctly positioned. Preferably, navigation system 4 may be coupled with the particular specific device 16 in such a manner that a particular specific device 16 is only operated when the particular specific device 16 is placed in the assigned location in clean room 2. Furthermore, it may be provided that, alternatively or additionally, the particular specific device 16 is only operated when the particular specific device 16 is connected/linked to the assigned ports.

Specific devices 16 and/or specific materials 18 which are to be placed in clean room 2 preferably have identifiers 20. These identifiers 20 may be designed in such a manner that navigation system 4 may identify devices 16/materials 18 on the basis of these identifiers 20. Preferably, navigation system 4 may automatically carry out the identification. For example, identifiers 20 may include RFID tags, barcodes and/or other GPS based chips/tags which are active and/or passive. An active identifier 20 would actively transmit its identification, while a passive identifier 20 only transmits its identification when, for example, it is stimulated by an outer field. In the case that a barcode is identifier 20, for example, navigation system 4 may have a read out feature enabling an identification.

In regard to materials 18, identifiers 20 may monitor when materials 18 expire so that the consumption in the manufacturing process or in warehousing is taken into account. For this purpose, navigation system 4 may provide a list which indicates the expiration dates in ascending or descending order when a system request is made.

Furthermore, it may be provided that navigation system 4 points by way of a light beam to a particular specific device 16 and/or a particular specific material 18. Preferably, navigation system 4 points to a device 16 and its location in the order or sequence in which it is provided in a process plan.

Furthermore, navigation system 4 includes a monitor or a display. This display 14 shows, for example, which pharmaceutical product has been chosen and is thus to be manufactured in clean room 2. Monitor/display 14 may furthermore display a list which lists all required/particular specific devices 16/materials 18. Moreover, monitor/display 14 may display a description which indicates where in clean room 2 specific devices 16/materials 18 are to be placed. Furthermore, monitor 14 may issue a command of manufacturing steps for processing specific materials 18.

Furthermore, it may be displayed on monitor or display 14 where the particular specific devices 18/materials 18 are located in the production site or in the storage facilities if these devices 16/materials 18 are not yet located in clean room 2. This may be carried out particularly by way of identifiers.

Navigation system 4 furthermore includes a user interface 22 enabling the user to make a system request and/or retrieve user information. Furthermore, a user may initiate certain projections by way of user interface 22 so that, for example, a projection indicates where all particular specific devices 16 and/or all particular specific materials 18 are to be placed in the still empty or only partially fitted clean room 2. Furthermore, a user may select that certain intermediate states/sequences of the configuration of clean room 2 are displayed.

If clean room 2 includes markers forming a grid in the floor area of clean room 2, a projection may be concerned with lighting a particular grid area (for example, by a laser point) by way of a notification in form of a point, circle or the like, so that a user may detect the assigned location for device 16/material 18.

Furthermore, navigation system 4 may project commands or information not only onto display/monitor 14 but, additionally or alternatively, also onto devices 16/materials 18 themselves. In particular, a display/monitor 14 may be a tablet computer or an iPad. Furthermore, a plurality of displays/monitors 14 may also be provided, and they may display different information. For example, a plurality of users may each have separate user interfaces 22 and, thus, manipulate/adjust the display of respective display/monitor 14.

Preferably, navigation system 4 may include an augmented reality function so that the user may see by way of virtual support how clean room 2 is to be configured. Furthermore, navigation system 4 may, alternatively or additionally, include a Google Glasses function.

In regard to the installation of the particular specific devices 16 and/or the particular specific materials 18, for example, written instructions for installation, videos and/or illustrations may be displayed supporting the user in the installation.

Furthermore, the augmented reality function enables a comparison between an intended user handling/procedure ("best practice") and the actual user handling/procedure. Preferably, one or a plurality of cameras records the precise user handling/procedure. If a deviation exceeding a limit is noticed in the comparison, the user is, for example, informed by a signal.

In particular, the term augmented reality is to be understood as a computer supported expansion of the reality perception. Information based on augmented reality may appeal to all human sensory modalities. In particular, augmented reality may be understood as a visual representation of information, for example, the supplementing of images or videos by computer generated additional information or virtual objects by way of overlay/masking. In an illustration or picture (for example, a real time illustration) of a clean room, for example, specific devices and/or specific materials may be overlaid and, that is, at or in relation to the locations where these specific devices and/or specific materials are to be placed. In other words, augmented reality may be understood as a direct or indirect live (real time) view of a physical/corporeal, real environment, the elements of which are augmented (or supplemented) by computer generated, sensory inputs/entries, for example, sound, video, graphics or GPS data. Augmentation/augmented reality is conventionally in real-time and in a semantic context including elements of the environment, such as sports scores on television during a match. With the aid of advanced augmented reality technology (for example, adding computer vision or object recognition), the information about the surrounding real world of the user becomes interactive and digitally manipulatable. Artificial information about the environment and its objects can be overlaid on the real world.

With regard to a clean room, using an augmented reality function enables to provide additional information, that is, relating to ports or connectors or interconnections of the devices/apparatuses, assembly or line connectors and/or providing/linking materials/raw materials/consumables. In particular, the user may be informed by way of an augmented reality function about which connection of a specific device is to be connected to which port of another connection. For this purpose, an augmented reality function may also specify certain hand movements or the handling.

According to one scenario, the following sequence for the configuration of a clean room 2 may be present:

A user enters empty clean room 2. Individual specific devices 16 (bioreactors, bags, containers, filtration devices, sensors, hoses, etc.) or the necessary specific materials 18 (for example, consumables or end products for the manufacture of the pharmaceutical product) required for the method for the manufacture of the selected pharmaceutical product are located in an adjoining room to clean room 2 or in a storage room.

The particular specific devices 16 have RFID tags (which are not required when working with the Google Glasses function). Navigation system 4 (for example, having augmented reality function and/or Google Glasses function) informs a user whether all consumables or materials (reactants, buffers, cell culture media) are available for the manufacture. If necessary, the navigation system informs the user about missing materials and orders said materials automatically when missing for a subsequent manufacture.

The user receives an itemized list from the navigation system providing a listing of all components (one-way and recyclable components) which are necessary to carry out the manufacture of a selected pharmaceutical product.

The floor of clean room 2 is visually and/or haptically divided into a checkerboard pattern. The individual fields of the checkerboard pattern are place holders for devices 16 to be subsequently placed in the clean room. A room grid of the clean room having navigation system 4 preferably includes a location detection, for example, by light and/or electromagnetic fields. Alternatively or additionally, the floor of the clean room includes a visually detectable grid. The floor of the clean room may have one or a plurality of quick response codes. A room grid may be detectable via Google Glasses. Alternatively or additionally, monitors (for example, having a 3D barcode) may be recessed into the floor of clean room 2 which direct the later positioning of the devices in the clean room. Navigation system 4, which, if necessary, is supplemented by augmented reality functionality, indicates to the user by way of light projections on the floor of the clean room at which locations of the room grid individual devices 16 have to be placed and how the individual components, for example, via hose lines or connectors, are to be linked/connected to one another (local distribution of the components in clean room 2). The correct connection/the correct port of the individual components may be indicated to the user by optic, sensory, verbal or acoustic signals of navigation system 4. The transport of devices 16 and other components necessary for the process (devices and/or materials) from the adjoining room and positioning of the components in clean room 2 are controlled via a Google Glasses functionality or another augmented reality functionality. The Google Glasses functionality shows the user a virtual image of all operable components installed in clean room 2, which together constitute a manufacturing system for a pharmaceutical product. The user may compare this virtual image with the real image in clean room 2 and receives instructions from the Google Glasses functionality, which further components (devices and/or materials) are to complete the system. The Google Glasses functionality sends the user in the adjoining room to collect components which are still missing and to take them to the appropriate place in clean room 2. The Google Glasses functionality also permits to verify whether all components are situated in the respectively correct place. Navigation system 4 indicates to the user by way of the augmented reality function which consumables (buffer bags, cell culture media bags, powders) have to be used in which time sequence during the process. Navigation system 4 issues a take-over protocol at a shift change (a new user continues the process as successor of the previous user) and outputs information about the current status of the process to the new user. The new user receives verbal and/or optical status information about the manufacturing step which just has been completed by the previous user before the shift change (for example, via a Google Glasses functionality).

According to a further scenario, the following sequence for the configuration of a clean room 2 may be present:

Clean room 2 already includes the individual components or devices 16 for the manufacturing process of a selected pharmaceutical product; however, it does not yet have the local positioning required for the manufacturing process. The Google Glasses functionality or other augmented reality functionality indicates to the user via light projections, electromagnetic fields or the aforementioned monitors having 3D barcodes to which positions the individual components have to be moved in the room grid.

The temporal sequence of the process steps for both aforementioned scenarios is subsequently described:

In both scenarios, navigation system 4 controls/regulates, via a connection with the individual components in clean room 2 (for example, wireless communication, Bluetooth, etc.), in which temporal sequence the components are used to run the manufacturing process.

According to a further scenario, the following sequence for the configuration of a clean room 2 may be present:

In empty clean room 2, the individual components are transported offset in time from one or a plurality of adjoining rooms via navigation system 4 into clean room 2, before or as soon as the manufacturing method has reached the stage at which the use of these individual components is required. These individual components control and/or regulate the individual manufacturing steps successively via navigation system 4 until all individual components are situated in the clean room by the end of the manufacturing process.

Dismantling the individual components after completion of the process for all scenarios:

After completing the manufacturing process of the selected pharmaceutical product, navigation system 4 indicates to the user in which manner the individual components are again uninstalled in clean room 2 and, if necessary, transported away to be transferred from the clean room to an adjoining room so that said components may be prepared for the next manufacturing process (calibration, validation, etc.).

LIST OF REFERENCE CHARACTERS

2 Clean room
4 Navigation system
6 Projector
8 Projection related to a specific material
10 Projection related to a specific device
12 Projection as a marking in the floor area
14 Display
16 Specific devices
18 Specific materials
20 Identifiers
22 User interface

What is claimed is:

1. A method for configuring a clean room (2) for the manufacture of pharmaceutical products comprising the steps:
   selecting a pharmaceutical product for the manufacture in the clean room (2);
   determining at least one specific item (18) for the manufacture of the selected pharmaceutical product; and
   using a navigation system to assign at least one floor area locations in the clean room (2) at which the at least one specific item determined to be necessary for the manufacture of the selected pharmaceutical product should be positioned in the clean room; and
   using the navigation system (4) to issues at least one notification (6, 8, 10, 12, 14) to indicate acoustically and/or haptically at least one floor area location in the clean room assigned for the at least one specific item for the manufacture of the selected pharmaceutical product.

2. The method of claim 1, further comprising:
   determining a sequence of manufacturing steps for processing specific materials (18);
   issuing a command which comprises at least a portion of the sequence of manufacturing steps to be determined for processing the specific materials (18); and
   issuing a status notification about the manufacture of the selected pharmaceutical product when a system request (14, 22) is made.

3. The method of claim 1, wherein the at least one item is at least one of a specific device necessary for the manufacture of the selected pharmaceutical product and a specific material necessary for the manufacture of the selected pharmaceutical product, the method further comprising:
   issuing user information about the presence or absence of the at least one specific devices (16) and/or the at least one specific materials (18); and
   ordering missing specific devices (16) and/or missing specific materials (18).

4. The method of claim 1, wherein the at least one item is at least one of a specific device necessary for the manufacture of the selected pharmaceutical product and a specific material necessary for the manufacture of the selected pharmaceutical product, and wherein the specific devices (16) and/or materials (18) have identifiers (20) for identifying and/or locating the specific devices (16) and/or materials (18) using the navigation system (4).

5. The method of claim 1, further comprising:
   providing markers in the floor area of the clean room (2), wherein the markers comprise a grid from a plurality of fields, wherein at least one portion of the fields has at least one portion of a space holder for an assigned specific item.

6. The method of claim 1, wherein the at least one notification is a light projection (6, 8, 10), an electromagnetic field (6, 8, 10, 12) and/or a display (14) indicating the location in the clean room (2) where the specific device (16) and/or the specific material (18) for the manufacture of the selected pharmaceutical product is to be placed.

7. The method of claim 1, wherein the at least one item is at least one of a specific device necessary for the manufacture of the selected pharmaceutical product and a specific material necessary for the manufacture of the selected pharmaceutical product, and the method further comprising:
   using the navigation system to assigning ports in the clean room (2) to which the at least one specific item is to be connected and then using the navigation system (4) to issue at least one notification (6, 8, 10, 12, 14) indicating to which specific ports the at least one specific is to be connected in the clean room (2); and issuing a status notification as to whether the at least one specific item is connected to the at least one specific ports according to the assignment when a system request (14, 22) is made.

8. The method of claim 1, further comprising:
providing a virtual image of a nominal state of the clean room (2), wherein, based on a system request (14, 22), the virtual image is compared to the actual state of the clean room (2).

9. The method of claim 1, further comprising:
providing a plurality of manufacturing instructions for the manufacture of pharmaceutical products.

10. The method of claim 1, wherein the navigation system (4) comprises an augmented reality function.

11. The method of claim 10, wherein, based on the augmented reality function, a comparison is made between an intended handling by a user and the actual handling by a user.

12. A computer program product comprising a non-transitory computer readable medium with instructions which, when executed by a computer, is designed to carry out the method according to claim 1.

13. The method of claim 1, wherein the step of using the navigation system to issue at least one notification comprises using the navigation system to issue a voice message to indicate at least one floor area location in the clean room assigned for the at least one specific item for the manufacture of the selected pharmaceutical product.

14. The method of claim 1, wherein the step of using the navigation system to issue at least one notification includes providing at least one haptically identifiable projection at one or more floor area locations in the clean room assigned for the at least one specific item for the manufacture of the selected pharmaceutical product.

15. The method of claim 14, wherein the at least one haptically identifiable projection is variably adjustable.

16. The method of claim 14, wherein the at least one haptically identifiable projection comprises at least one of a line and an arrow.

17. The method of claim 1, further comprising using the navigation system (4) to issue at least one notification (6, 8, 10, 12, 14) to indicate visually at least one floor area location in the clean room assigned for the at least one specific item for the manufacture of the selected pharmaceutical product in addition to indicating acoustically and/or haptically the at least one floor area location in the clean room assigned for the at least one specific item for the manufacture of the selected pharmaceutical product.

18. A clean room (2) for the manufacture of a pharmaceutical product selected from a plurality of different pharmaceutical products, the selected pharmaceutical product being manufactured by specific devices (16) and/or specific materials (18) that can be placed in the clean room (2), the clean room comprising:

a navigation system (4) that issues at least one notification (6, 8, 10, 12, 14) indicating acoustically and/or haptically one or a plurality of positions in the clean room (2) where the specific devices (16) and/or the specific materials (18) necessary for the manufacture of the selected pharmaceutical product are to be placed.

19. The clean room of claim 18, wherein the at least one notification comprises at least one haptically identifiable projection at one or more floor area locations in the clean room assigned for the at least one specific item for the manufacture of the selected pharmaceutical product.

20. The clean room of claim 19, the at least one haptically identifiable projection is variably adjustable.

* * * * *